United States Patent
Sydnor, Sr.

[11] 3,907,126
[45] Sept. 23, 1975

[54] FEEDING APPARATUS FOR PHYSICALLY HANDICAPPED PERSONS

[76] Inventor: Garland S. Sydnor, Sr., 9 Stonehurst Green, Richmond, Va. 23226

[22] Filed: Oct. 23, 1974

[21] Appl. No.: 517,158

[52] U.S. Cl. ............................ 214/1 T; 214/1 CM
[51] Int. Cl.² .................................... A47G 21/08
[58] Field of Search........ 214/1 R, 1 T, 1 CM, 1 BC

[56] References Cited
UNITED STATES PATENTS
| | | | |
|---|---|---|---|
| 3,317,061 | 5/1967 | Causey | 214/1 T |
| 3,734,306 | 5/1973 | Morewood | 214/1 T |

*Primary Examiner*—Frank E. Werner
*Attorney, Agent, or Firm*—Warren N. Low; Richard P. Matthews

[57] ABSTRACT

A feeding apparatus for physically handicapped persons which is completely controlled by a touch operated switch. A table which supports the apparatus and the food to be served is provided with an aperture through which the food is deposited onto a spoon. The latter is initially positioned beneath the aperture in the table and is moved outwardly through an arc of approximately 90° where the food may be consumed. The spoon is then returned for another spoonful. The apparatus further includes food receptor or carriage means positionable forwardly and rearwardly on the table, food bar means on the carriage means for holding the food, indexing means and a plunger dispenser means. Electric motor operation is provided for each of the spoon, carriage, indexing and plunger members all under the control of the touch operated switch.

20 Claims, 16 Drawing Figures

FEEDING APPARATUS FOR PHYSICALLY HANDICAPPED PERSONS

This invention relates to an apparatus for feeding physically handicapped persons and, more particularly, to such an apparatus which is provided with touch operated switch means whereby the handicapped person may readily feed himself after the food is pre-loaded into the apparatus.

Heretofore, various attempts have been made to provide devices by which a handicapped person or invalid could feed himself after the food has been properly prepared and preloaded for the person. These devices have not gained substantial adoption and implementation by nursing homes, hospitals and the like primarily because the prior art devices were too cumbersome or too time-consuming in their operation and not sufficiently versatile.

It is believed that the present invention is sufficiently compact and relatively easy to employ while still being sufficiently economical and versatile so as to appeal to those who operate hospitals, nursing homes and the like and thereby gain substantial acceptance. Furthermore, it has been found in the development of this apparatus that those who use the apparatus to feed themselves actually enjoy the experience and look forward to its usage.

As has been indicated, the general type of device to which the invention pertains is a touch-operated feeding device whereby a patient who is completely unable to use his arms and hands may operate the device, for example, by touching one's cheek or chin to the touch-operated switch controls. Of course, the apparatus may be readily adapted to other control switching means depending upon the particular disability of the person using the device.

In a preferred form of the invention, the apparatus comprises a table means which not only supports the food to be served but also supports all the motor-operated means by means of which the food is conveyed ultimately to the mouth of the patient or user. The table is provided with an aperture through which the food to be served passes onto a spoon means which is capable of being positioned beneath the aperture. The spoon means is spring-mounted at the end of a rod which moves through an arc of approximately 90° at which position the food may be consumed by the person using the apparatus. A touch-operated switch means re-positions the spoon beneath the aperture in the table at which point the person operating the apparatus may continue the feeding process.

The apparatus includes motor-operated food receptor means or carriage means which may be reciprocated on suitable track means provided therefor forwardly and rearwardly on the table. By this means, it is possible to align one or another of a series of food bar means which are filled with the prepared food and which are held by trays in the food receptor or carriage means. The food bar means are provided with a plurality of apertures, preferably cylindrical in nature which are alignable by lateral movement provided by indexing means with an aperature in their holding trays and the aperture in the table which also is preferably cylindrical.

The indexing means moves a selected food bar laterally of the table a predetermined distance toward the aperture in the table so as to position sequentially the holes in the food bar in alignment with the hole in the table. The indexing means preferably comprises a motor-driven single revolution crank means the actuation of which is controlled by the touch-operated switch means. By making the distance between centers of adjacently positioned apertures in the food bar means equal, it becomes possible to use a uniform length of indexing stroke by the indexing means. It is preferred to make the release point of the indexing means adjustable whereby different sized food bar means may be employed, if desired. This feature also makes the apparatus more versatile.

With one of the apertures in the food bar means positioned directly over the aperture in the holding tray and in the table, the food is in position to be dispensed. Certain foods will be dispensed automatically by gravity in this position, but to ensure complete dispensing of the food and to aid in the dispensing of certain other foods, an electric motor-driven plunger means is capable of being actuated by the touch-operated switch means. The plunger itself is preferably made in at least two parts with the lower portion suspended by a swivel from the upper portion to facilitate the insertion thereof into the aligned aperture in the food bar means.

The plunger is also preferably mounted on a cantilevered support means with the plunger driven only on the up portion of its stroke and returned by gravity on its down stroke portion. Therefore, no damage will result to the carriage means or food bar means if they should become misaligned with the plunger for any reason.

The apparatus includes electric motor operation for each of the spoon means, the food carriage means, the indexing means, and the plunger means all of which are controlled by a centrally positioned touch-operated switch means. An emergency cut-off switch means is also provided whereby the electric current to all of the electric motor-operated means may be interrupted substantially instantaneously. This emergency cut-off switch means is also touch-operated and centrally located whereby the person using the machine can shut off the machine immediately should the need arise.

Suitable lock-out means are provided so that malfunctions do not occur because the person using the machine accidentally activates the wrong electric motor-operated means. For example, when the spoon means is away from its food-receiving position, switch means are provided for interrupting the electric current to all of the electric motor-operated means except the electric motor-operated spoon means thereby permitting its return to the food-receiving position before any other motor-operated means can function. Similarly, the lock-out or electric motor incapacitating means are provided so that the food is advance toward the aperture in the table in a proper and logical sequence.

The inherent advantages and improvements of the present invention will become more readily apparent upon considering the following detailed description of the invention and by reference to the drawings in which.

Figure 1:
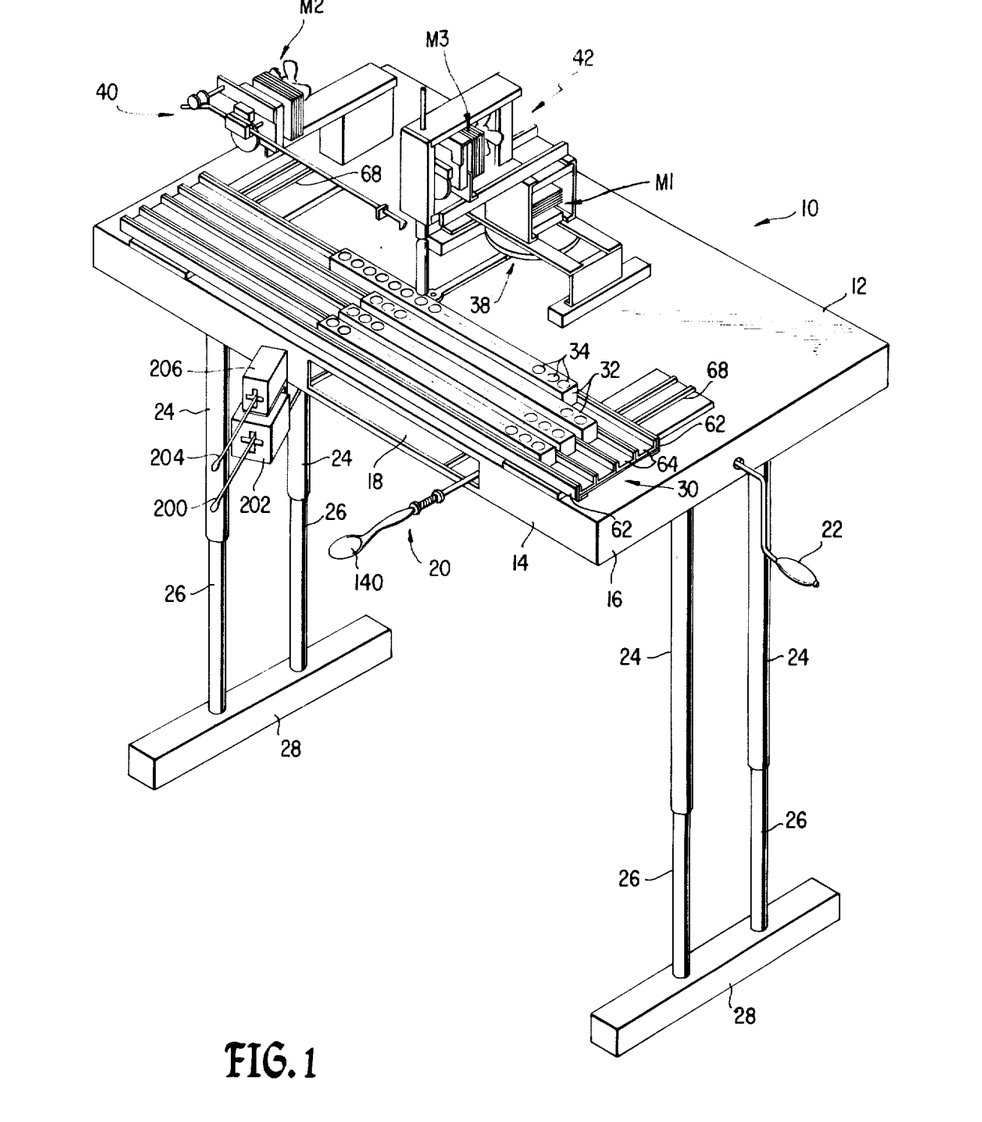
FIG. 1 is a perspective view of the feeding apparatus of the present invention.

Referring now more particularly to FIG. 1 of the drawings, there is illustrated a feeding machine indicated generally at 10 having a deck or table top 12 which is provided with a front skirt 14 and a side skirt 16. The deck or table top 12 is further provided with a rectangular opening 18 in front skirt 14 by means of which spoon means indicated generally at 20 may be oscillated between two fixed stopped positions for feeding a patient or invalid as will be described in greater detail hereinafter.

The feeding machine 10 is provided with a crank handled 22 by means of which telescoping legs 24, 26 may be raised or lowered by suitable screw means to achieve a desired elevation of the table top 12 for feeding the person using the machine. The telescoping legs 24 and 26 are suitably supported from a stand or base 28.

A carriage means is indicated generally at 30 in FIG. 1 for purposes of carrying a plurality of food bars 32 which are provided with a series of apertures 34 which ride in trays 64.

Figure 5:
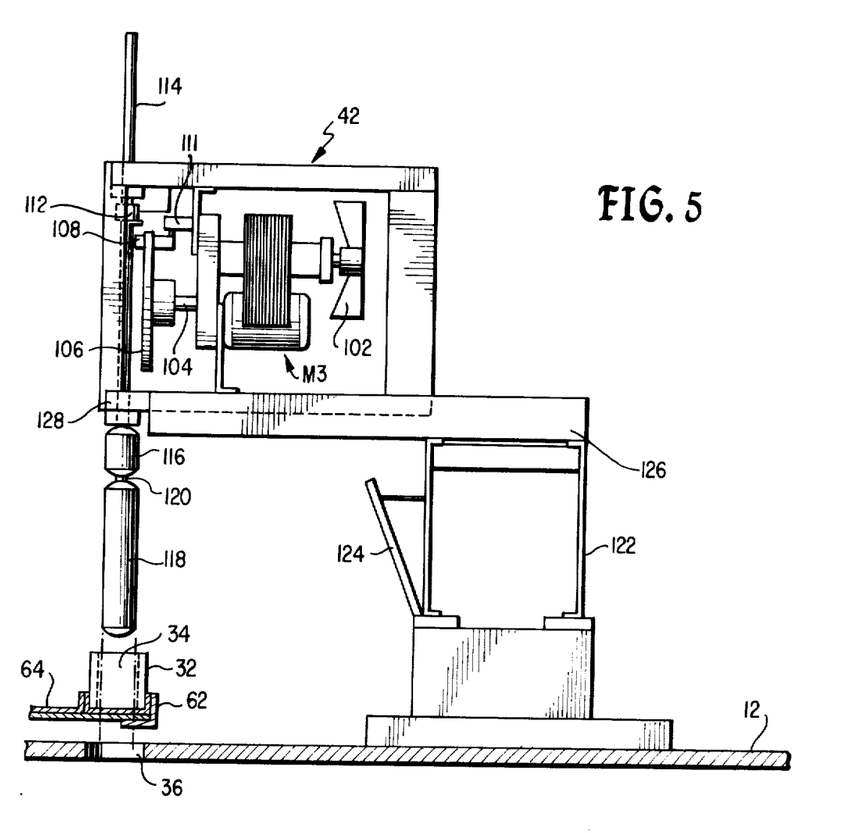
FIG. 5 is a side elevational view, with parts broken away, further illustrating the apparatus for driving the plunger means.

As seen best in FIG. 5, the table 12 is provided with an aperture 36 which is alignable with a selected aperture 34 in food bars 32 when properly positioned thereover and riding in its associated tray. The apparatus includes a carriage propulsion means indicated generally at 38 in FIG. 1 which includes a carriage motor means designated M1 in FIG. 1. An indexing means is generally indicated at 40 in FIG. 1 and it includes a motor M2 in order to advance the food bars laterally to the left in FIG. 1 as will be explained in greater detail hereinafter.

The appratus further includes a plunger propulsion means indicated generally at 42 in FIG. 1 which includes a plunger means motor M3.

Figure 7:
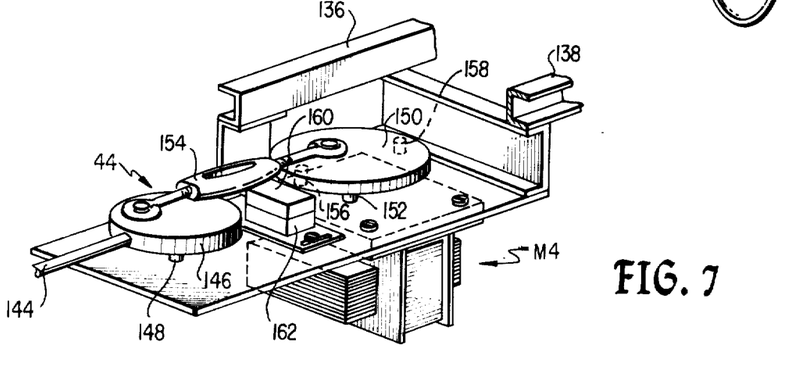
FIG. 7 is a fragmentary perspective view further illustrating the apparatus for driving the spoon means.

Reference to FIG. 7 illustrates a spoon propulsion means indicated generally at 44 which includes a spoon means motor M4.

CARRIAGE PROPULSION MEANS

Figure 2:
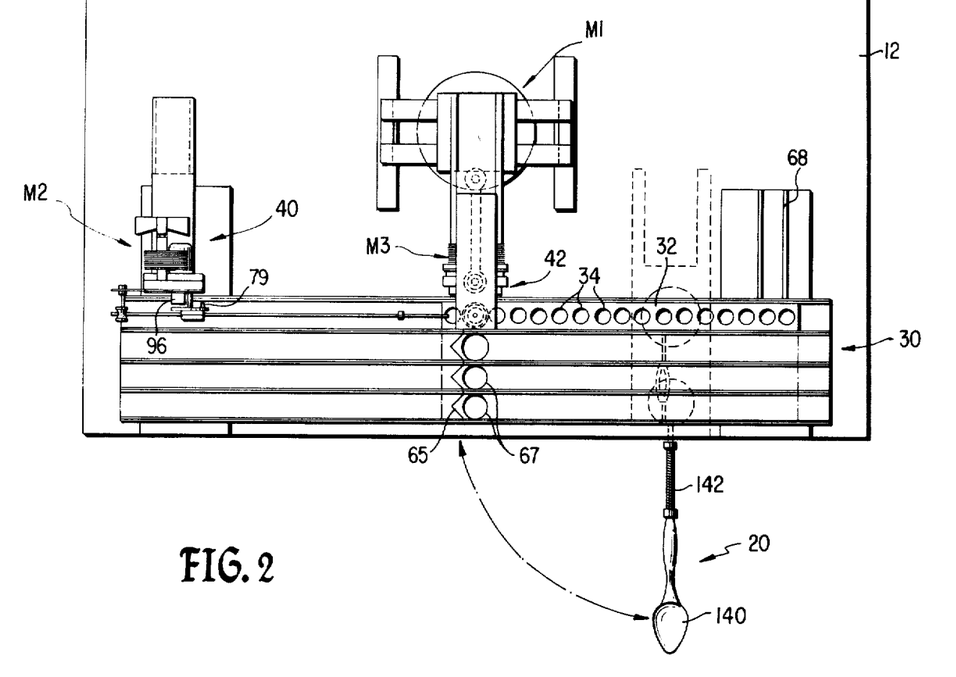
FIG. 2 is a top plan view of the apparatus shown in FIG. 1.
Figure 8:
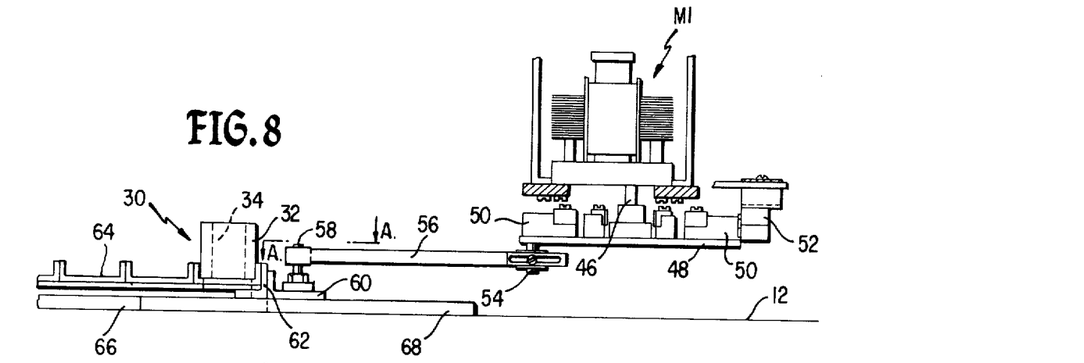
FIG. 8 is a fragmentary side elevational view, with parts removed, illustrating the apparatus for driving the carriage means of the present invention.

Reference is made to FIGS. 1, 2 and especially FIG. 8 for the details of the carriage propulsion means 38. Motor M1 has an output shaft 46 which carries a rotating plate or disk member 48 on which is rotated a plurality of adjustable switch contact means 50. One switch contact means 50 is provided for each of the desired stops of the carriage means such as for each of the food bars 32 and trays 64 carried by the carriage means 30. A stationarily positioned microswitch means 52 opens an electrical circuit whenever it is contacted by one of the adjustable switch contact means 50.

An eccentrically mounted pin and lever arm convert rotation of disk member 48 into reciprocation of carriage means 30. Thus a pin 54 is eccentrically mounted on the rotating plate or disk member 48 and passes through one end of connecting rod 56. Another pin 58 passes through the remote end of connecting rod 56 and is connected to an attaching lug 60 for L-shaped support bracket 62 of the carriage means 30. Another L-shaped support bracket is positioned at the front of the carriage means 30 in order to carry tray members 64. The tray members 64 are preferably split in two and provided with a V-shape tongue and groove as seen at 65 in FIG. 2. Therefore, the tray members 64 are of a length to fit readily into a commercial dishwasher. Apertures 67 are transversely in line with aperture 36 in table 12 with the trays 64 suitably locked into position on table 12 by any suitable means, not shown.

Figure 8A:
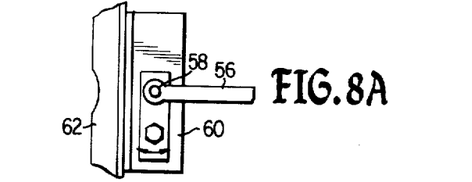
FIG. 8A is a fragmentary top plan view as viewed from line A-A of FIG. 8.

A suitable track or guide member 66 is carried on the underside of the L-shaped support brackets of the carriage and cooperates with a mating track means 68 on table 12 in order to maintain the carriage means 30 substantially parallel to the front of table 12 as it moves in its reciprocatory motion. Since pin 54 is eccentrically mounted with respect to the shaft 46 of motor M1, rotation thereof causes rotation of pin 54 and by means of connecting rod 56 and pin 58 is confined so as to result in reciprocatory movement of the carriage means 30 by virtue of the cooperating track members 66 and 68. The initial position of the carriage means 30 is made adjustable by rotating the pin holder mounted on lug bracket 60, as seen in FIG. 8A, and locked in position by tightening a bolt nut which clamps the pin holder to the upper face of bracket 60. This mechanism is easily accessible for adjustment. The adjustable switch contact means 50 are positioned with respect to microswitch means 52 in order to align the series of apertures 34 in a given food bar means with the aperture 36 in table 12 so that when the indexing means 40 is energized in the manner to be described hereinafter, successive apertures 34 in a particular food bar 32 are positioned over the apertures 36 and 67.

INDEXING MEANS

Figure 3:
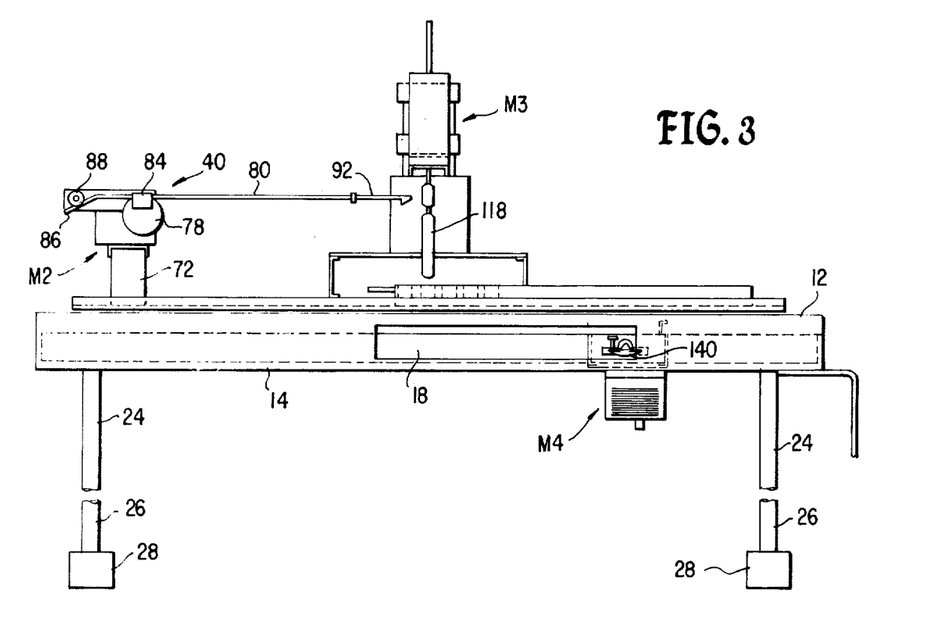
FIG. 3 is a front elevational view of the apparatus shown in FIG. 1.
Figure 9:
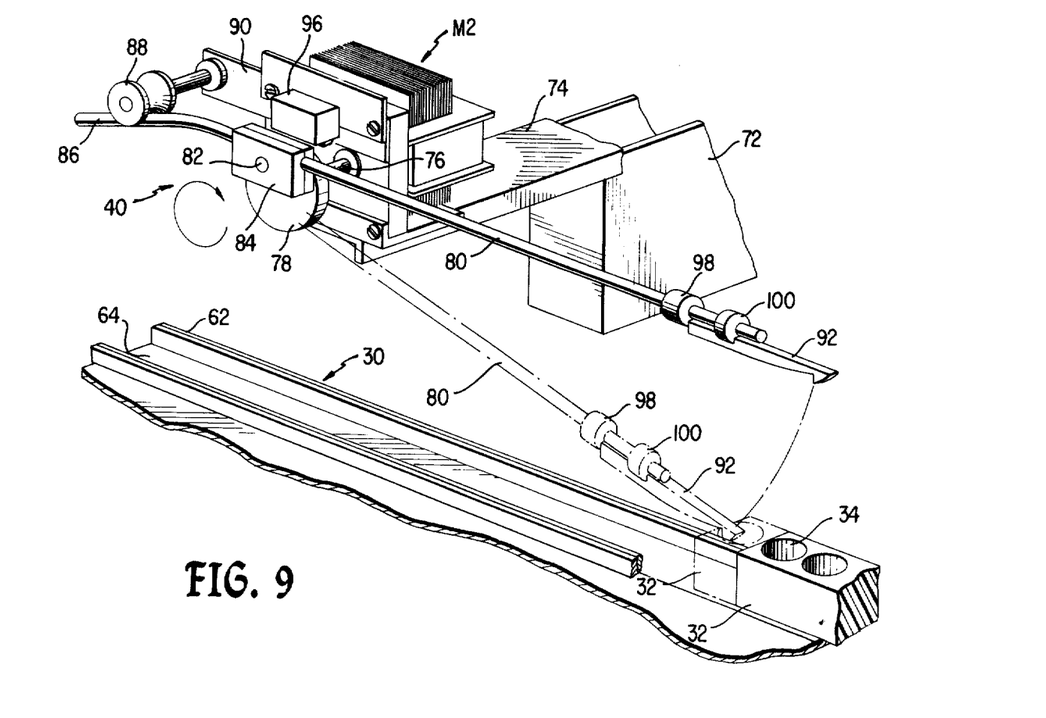
FIG. 9 is a fragmentary perspective view, drawn to an enlarged scale, illustrating the appratus for driving the indexing means of the present invention.

Reference is made to FIGS. 3 and 9 for the details of the indexing means 40. A support platform means 72 is suitably mounted on table 12 and a cantilevered channel member 74 extends therefrom forwardly of the table to support an indexing motor means M2. The output shaft 76 of motor M2 drives a disk 78 which carries pin 79 (FIG. 2) and 82 (FIG. 9) with pin 79 being engageable with microswitch 96 to limit the rotation of disk 78 to a single revolution per energization of motor M2.

An indexing lever arm 80 is pivotally attached at 82 to suitable mounting blocks 84 which are grooved to receive a portion of the lever arm 80. The rearwardly extending portion of lever arm 80 is downwardly bent at 86 in order to provide for the desired movement consisting of an incremental advance or throw for the lever arm 80 when it cooperates with cam follower member 88. The cam follower member 88 is mounted on mounting plate 90. The forward end of indexing lever arm 80 carries a hook member 92 having a hooked end 94 which moves between the full line and phantom line positions in FIG. 9 as the single revolution disk 78 completes its revolution and returns to its starting point. In so doing, the hook 94 of hook member 92 engages one of the apertures 34 in a food bar member 32 which is aligned therewith and effects the incremental advance to re-position the next succeeding aperture on the food bar 32. By making the diameter of the apertures 34 in the food bar means 32 equal to one another with equal spacing between the holes, it become possible to utilize a constant increment of advance for the indexing means in order to bring successive apertures 34 in the food bar means 32 into alignment with the aperture 36 in table 12. Although each aperture 34 in a food bar means 32 which conveys food extends entirely through the food bar 32, it is possible to have the first or the first two positions on the food bar 32 to be "dummy" holes which extend only partially through the food bar and which are used only for indexing of the food bar. Adjustment of collar members 98 and 100 make it possible to vary the position of the hook and therefore the length of stroke imparted to the food bar member 32.

PLUNGER DISPENSING MEANS

Figure 4:
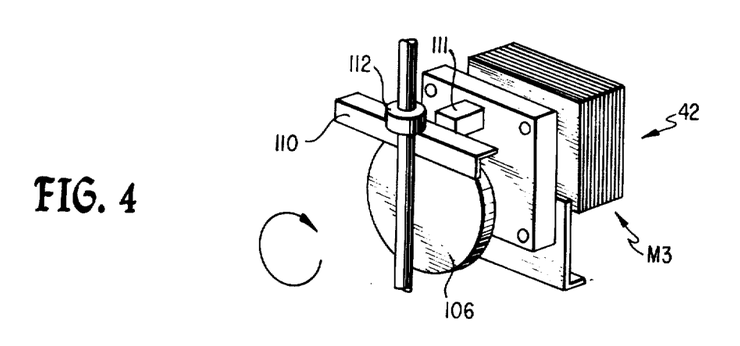
FIG. 4 is an enlarged fragmentary perspective view illustrating the apparatus for driving the plunger means of the present invention.

Reference is made particularly to FIGS. 4 and 5 for the details of the plunger dispensing means 42. In FIG. 5, for example, it will be observed that motor M3 is provided with an integral fan means 102. Similar integral fan means may be used on all motors used herein. It is also preferable to employ magnetic brake motors for each of the motors used in connection with this invention so that the motors will stop substantially instantaneously without overrun. The output shaft of the motor M3 is shown at 104 and the disk member 106 rotated thereby.

A modified Scotch yoke is employed so that the piston is driven only on its up stroke and permitted to return by gravity on its down stroke. Thus drive pin 108 is eccentrically mounted on disk member 106 and is positioned beneath a horizontally extending leg of an L-shaped crosshead 110, rather than within the conventional channel-shaped crosshead on Scotch yokes, and a drive collar 112 is locked to plunger shaft 114 on the top of the crosshead. Thus as shaft 104 rotates the drive pin 108 drives the crosshead 110 and lifts the plunger shaft 114 on the up stroke and permits the plunger shaft to return by gravity on the down stroke. The drive pin 108 extends through the rear of disk member 106, to the right in FIG. 5, to engage a microswitch 111 and stop the plunger means in its elevated position.

A plunger is provided at the end of the shaft which preferably is made from a plurality of parts. Thus there is illustrated an upper plunger member 116 and a lower plunger member 118 which is swivel mounted at 120. With an aperture 34 in a food bar member 32 in vertical alignment with both the aperture 36 and table 12 and the lower plunger member 118, it will be seen that upon reciprocation of plunger shaft 114 that plunger 118 will enter the aperture 36 in food bar 32 and the aperture 67 in its associated tray 64 and drive any food in food bar 32 through the aperture 36 thereby effecting dispensing of the food at what is designated as a food-receiving position. As will be described in greater detail hereinafter, the spoon means 20 is positioned beneath the aperture 36 in order to receive the food at the food-receiving position and swing it through an arc of approximately 90° to a food-consuming position. In order for the person using the machine to be able to see the relative position of the food bar means with respect to the plunger 118, it is helpful to mount a mirror 124 on the front of support 122 inclined at such an angle so as to permit viewing of the food in the food bars 32 at the food-receiving position by the user. If the food is of such a consistency so as to be dispensed by gravity, the piston dispensing cycle may be bypassed. A lever arm 126 and support plate 128 are cantilevered from support 122.

SPOON PROPULSION MEANS

Figure 6:
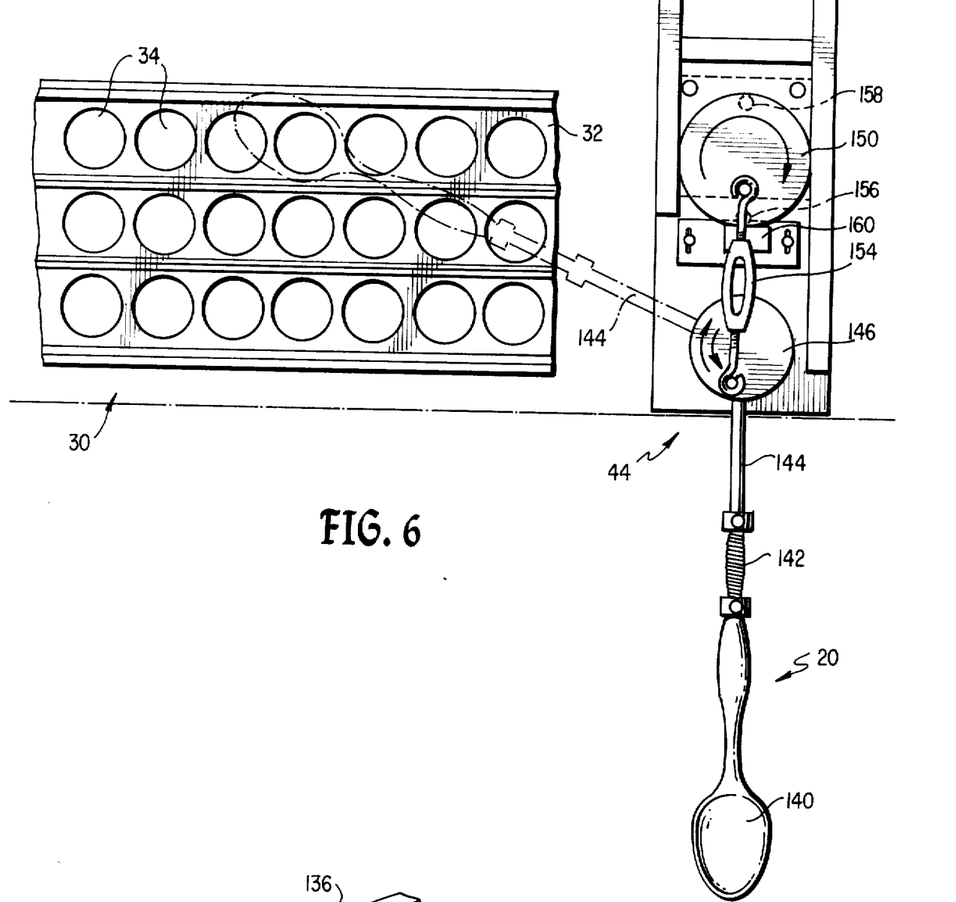
FIG. 6 is a fragmentary top plan view, drawn to an enlarged scale, illustrating the apparatus for driving the spoon means of the present invention.

Reference is now made to FIGS. 6 and 7 for the details of the spoon propulsion means 44. There is illustrated suitable attaching means to the underside of table 12 in the form of a pair of channel members 136 and 138 to suspend the spoon propulsion means 44. The latter includes a spoon 140 which is spring mounted at 142 to the end of lever arm 144. A disk plate member 146 is mounted for oscillation on a fixed pin 148 and is driven by a connecting rod member 154 attached to a second disk plate member 150. The latter is driven by the output shaft 152 of spoon motor M4. Connecting member 154 is eccentrically mounted and adjustable in its position to establish an oscillatory movement for lever 144 as disk 150 rotates continuously in a clockwise direction as viewed in FIG. 6. The disk plate 150 carries two pin members on the underside surface thereof. These pin members are shown in dotted lines at 156 and 158 in FIGS. 6 and 7. Pin member 156 is shorter than pin member 158 and extends downwardly from disk plate 150 only far enough to engage microswitch 160 which is vertically stacked above another microswitch 162. Pin member 156 engages upper microswitch 160 to stop the spoon 140 in its fully extended position shown in full lines in FIG. 6 whereas pin member 158 engages both microswitches 160 and 162 to stop the spoon 140 in its food-receiving position shown in phantom in FIG. 6.

Figure 10:
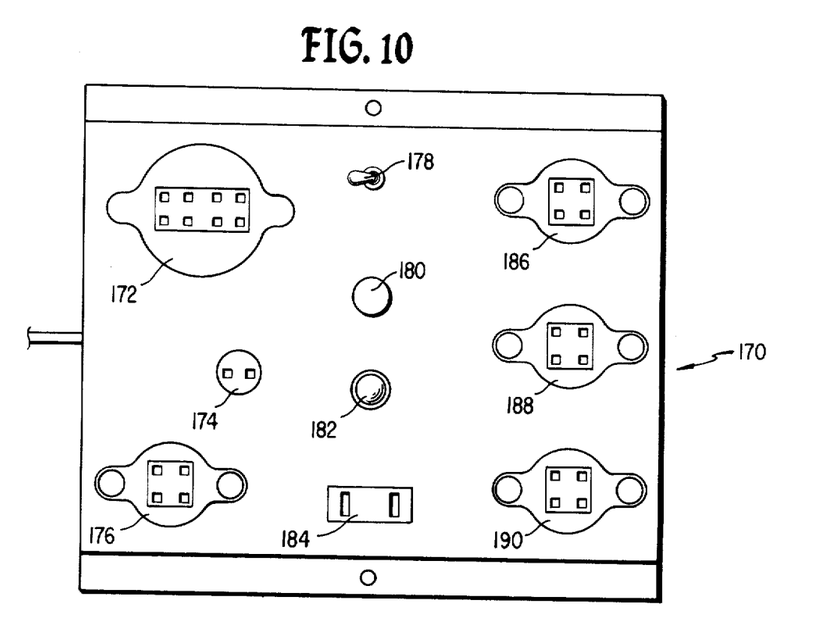
FIG. 10 is a top plan view of the control panel of the feeding apparatus of the present invention.

A control panel is indicated generally at 170 in FIG. 10 which makes all electrical connections to the feeding apparatus extremely handy. There is shown an eight-point female plug at 172 for the master control switch arm 200 in FIG. 1. A two-point socket is shown at 174 which provides emergency cut-off by means of switch arm 204 in FIG. 1 in a manner to be described hereinafter. A four-point socket 176 is provided for the spoon control motor M4. A hand switch is shown at 178 in FIGS. 10 and 15 so that the entire machine can be turned "off" from the control panel. A fuse is shown at 180 and pilot lights 182 and another panel light 182a is used at the spoon-filling location. Numeral 184 designates an unfused 110-volt auxiliary power. A four-point socket is shown at 186 for the motor M1 which is a four-positioned front-to-rear carriage-positioning means when four food bars are employed. A four-point socket for motor M2 is shown at 188 which is used in conjunction with the indexing means to move the food one position to the left as viewed in FIG. 1. Finally, a four-point socket is provided at 190 for the motor M3 which provides for the reciprocatory vertical motion of the discharge plunger means 42.

Figure 11:
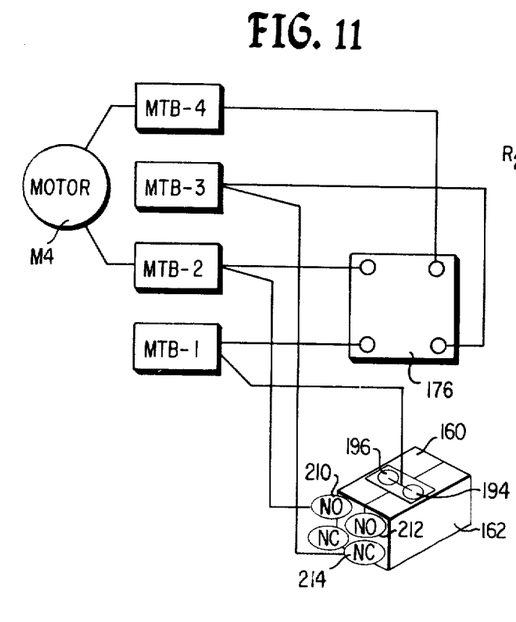
FIG. 11-14 illustrate typical motor unit wiring diagrams for the feeding apparatus of the present invention; and, FIG. 15 is a schematic wiring diagram of the feeding apparatus of the present invention.
Figure 12:
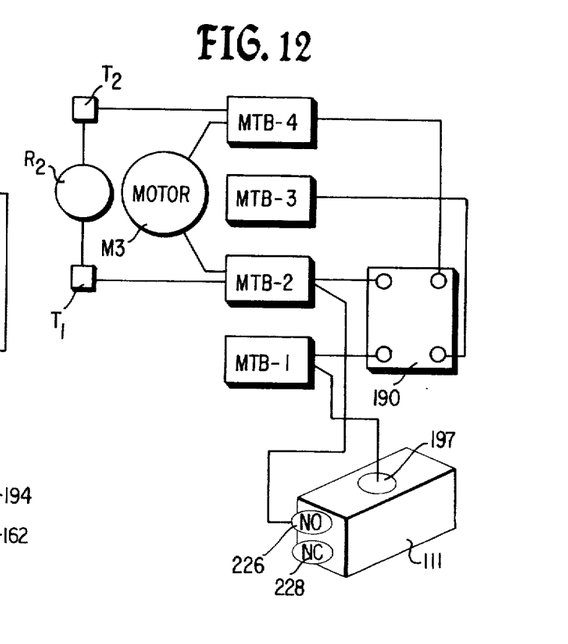

FIGS. 11 and 12 illustrate typical motor unit wiring diagrams. FIG. 11 shows the wiring for motor M4 and is also substantially typical for motors M1 and M2 except that only one microswitch is used while FIG. 12 shows the wiring diagram for motor M3. In each diagram MTB-1, 2, 3 and 4 indicate the motor terminal block members for the motors. Thus motor M4 is shown to be connected between motor terminal blocks 2 and 4 and to two of the terminals for the four-point socket 176. MTB-2 is shown to be connected to the normally open contact 210 of microswitch 160 and MTB-3 is connected to the normally closed contact 214 of microswitch 162 with the two microswitches arranged so that common terminals 194 and 196 are connected to MTB-1.

In FIG. 12, a typical wiring diagram for motor M3 illustrates the motor connected between motor terminal blocks 2 and 4 with MTB-2 also being connected to the normally open contact 226 of microswitch 111. MTB-1 is connected to the common terminal 197 and contact 228 of microswitch 111 is not used. The circuit shows the connection of the four-point socket 190 for the motor M3.

Figure 13:
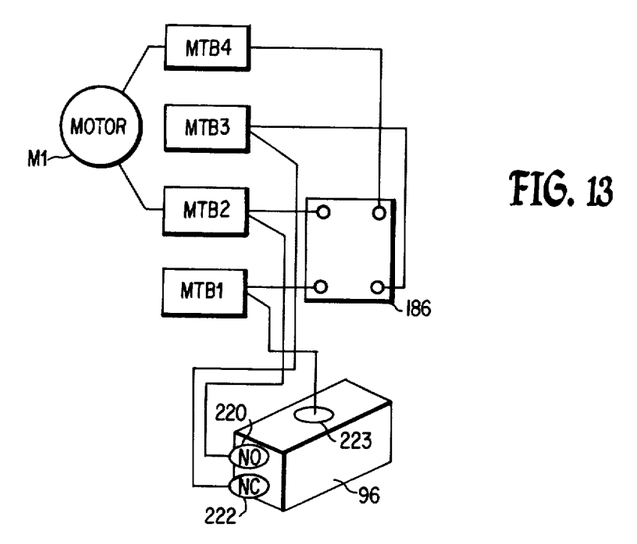
Figure 14:
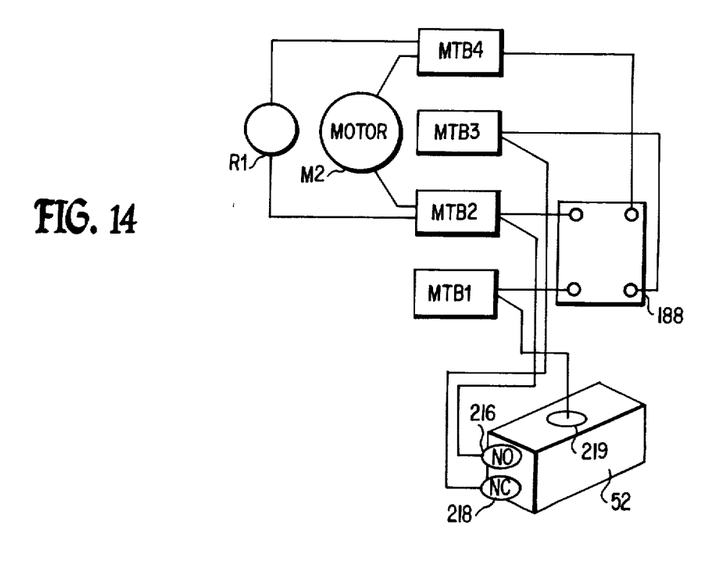

In FIGS. 13 and 14, typical wiring diagrams are shown for motors M1 and M2, respectively. The diagrams are generally similar except that motor M2 has a relay R1 in parallel with the motor for opening a normally closed contact 224 (FIG. 15) whereby motor M1 for advancing and retracting the carriage means cannot be operated when the indexing motor M2 is in operation. Microswitch 96 is shown in FIG. 13 with normally open contact 220 and normally closed contact 222 connected between motor terminal block positions 2 and 3, respectively. Common terminal 223 is connected to motor terminal block number 1. Microswitch 52 in FIG. 14 is shown with normally open contact 216 and normally closed contact 218 connected between motor terminal block positions 2 and 3, respectively. Common terminal 219 is connected to motor terminal block number 1.

A wobble stick switch or master control switch 200 is illustrated in FIG. 1 with a box mounting 202 to the table 12. The master control switch 200 has four start positions which are of the momentary contact switch type only. These positions and directions as viewed in FIG. 1 are "down" to actuate motor M4, "left" to actuate motor M1, "up" to actuate motor M2 and "right" to actuate motor M3. Mounted above the wobble stick or master control switch 200 is an emergency cutoff switch 204 which also has a box mounting 206 to table 12. This switch which is shown in FIG. 1 and in FIG. 15 is a normally open stick-type touch switch for all feeder power and is lodged in closed position for operation.

Figure 15:
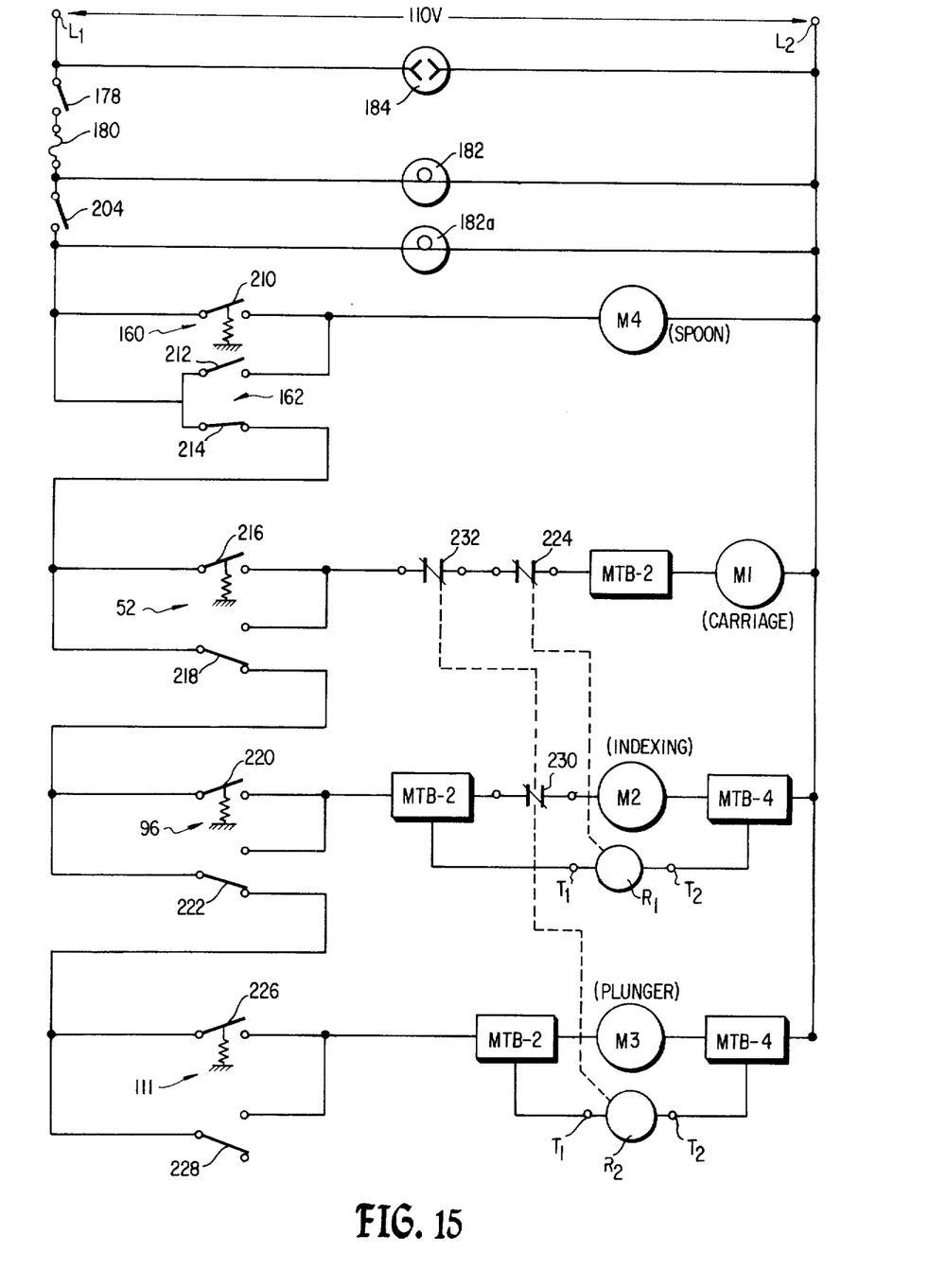

Referring now in particular to FIG. 15, the operation of the feeding apparatus will be explained in connected therewith. In the "down" position of the wobble stick or master control switch 200, normally open contact 210 is momentarily closed and motor M4 is actuated momentarily. When the motor M4 is actuated, normally open contact 212 is closed and opens when the spoon reaches its stop point either at the food-receiving position beneath the aperture 36 in table 12 or in the food-consuming position illustrated in FIG. 1. Contact 214 of microswitch 162 is open if spoon 140 is not at the filling location. Therefore, if the spoon is not at the filling location the circuitry to motors M1, M2 and M3 are all opened by contact 214 whereby nothing can happen unless the spoon is in the food-filling location at the food-receiving position.

When the wobble stick or master control switch 200 is moved to the left, normally open contact 216 of microswitch 52 is momentarily closed thereby making it possible to actuate motor M1 and effect movement of the carriage means 30. Normally closed contact 218 moves from the position shown in FIG. 15 to the upper position establishing a hold circuit for motor M1 whereby the motor M1 continues to rotate until the carriage reaches a stop point determined by the positions set for adjustable switch contact means 50 in FIG. 8. At this point, contact 218 is returned to the position shown in FIG. 15 whereby it becomes possible to energize motor M2 and effect indexing of the food bars 32. This is further accomplished by moving the wobble stick or master control switch 200 to its "up" position in FIG. 1 thereby closing normally open contact 220 of microswitch 96 and establishing a holding circuit by contact 222 which moves to the upper contact position in FIG. 15. Contact 222 remains in its holding circuit position until the single revolution crank 78 (FIG. 2 and FIG. 9) completes its revolution and interrupts the circuit to contact 222 of microswitch 96 whereby it returns to the lower contact position shown in FIG. 15. Also, when contact 220 is closed and motor M2 is energized, relay R1 causes normally closed contacts 224 to open thereby making it impossible to move the carriage through the intermediary of motor M1 when motor M2 is operated.

When normally open contact 226 of microswitch 111 is momentarily closed as the wobble stick 200 is moved to the "right" position as viewed in FIG. 1, motor M3 is energized thereby actuating the plunger propulsion means 42 (FIG. 1). When motor M3 for the plunger dispenser means is actuated relay R2 which is electrically parallel therewith is actuated thereby opening the normally closed relay contacts 230 and 232 and making it impossible for either motor M1 or M2 to be energized during the period that motor M3 is energized. The contact 228 of microswitch 111 is not used to extend the circuit since no additional motors are employed. If desired, a separate relay could be used for each motor instead of the interlock system illustrated.

The wobble stick or master control switch 200 is touch-actuated and is intended to be actuated by the cheek or chin of the person being fed. For this purpose, the wobble stick 200 and emergency cut-off switch 204 are positioned closely adjacent the food-consuming position when the spoon 140 is fully extended as shown in FIG. 1.

With the use of four food bars 32 such as is illustrated in FIG. 1, it becomes possible to use a particular food bar for a particular food. Thus, food bar number 1 may contain salad, food bar number 2 may contain a first vegetable, food bar number 3 may contain a meat product, and food bar number 4 may contain dessert. With the spoon in the food-receiving position the person being fed selects the particular food bar that he wishes to eat from by moving the wobble stick 200 to the left until the carriage means being driven by motor M1 positions the food bar that is desired in a proper position. Each energization moves the food bars 32 forward one position as established by adjustable switch contact means 50 (FIG. 8). Double or triple energization is possible by repeated use of the wobble stick 200 to select a desired food bar until the most forward position is reached. Thereafter, the carriage is returned to the most rearward position on the next energization.

By moving the wobble stick or master control switch 200 to the "up" position the food bar 32 that is selected is indexed to the left one hole for each actuation of the wobble stick 200. In normal operation, with the patient having completed or eaten the food in one hole a single indexing is required to bring the next hole into alignment with the aperture 36 in table 12.

While the performing motions described herein are motorized, they could also be obtained by the use of solenoids with or without dampers. Also the motions could be accomplished hydraulically or pneumatically to produce substantially the same results.

While presently preferred embodiments of the invention have been illustrated and described, it will be recognized that the invention may be otherwise variously embodied and practiced within the scope of the claims which follow.

What is claimed is:

1. A feeding apparatus for physically handicapped person which comprises:
   a. table means for supporting the food to be served,
      1. said table means having an aperture through which the food to be served is passed,
   b. spoon means adapted to be positioned beneath said aperture in said table means,
      1. means for moving said spoon means from a food-receiving position beneath said aperture in said table means to a position where the food on said spoon means may be consumed,
   c. food receptor means in which the food to be served is received,
      1. said food-receptor means being movable toward and away from said aperture in said table means whereby said food may be dispensed,
   d. and touch-operated switch means for controlling said spoon means and said food-receptor means.

2. A feeding apparatus as defined in claim 1 wherein said food-receptor means comprises a plurality of food bar means with each bar having a plurality of apertures therein alignable with said aperture in said table means.

3. A feeding apparatus as defined in claim 2 wherein said apparatus further includes carriage means for supporting said food bar means with means for moving said carriage means forwardly and rearwardly on said table means.

4. A feeding apparatus as defined in claim 3 wherein the position of said carriage means is controlled by said touch-operated switch means.

5. A feeding apparatus as defined in claim 3 wherein said carriage means and said table means are provided with cooperating track means.

6. A feeding apparatus as defined in claim 2 including mirror means mounted above said table means to permit the person being fed on said apparatus to view food which is received in said food bar means.

7. A feeding apparatus as defined in claim 2 including indexing means for moving a selected food bar means a predetermined distance toward said aperture in said table means.

8. A feeding apparatus as defined in claim 7 wherein said indexing means includes a motor driven single revolution crank means the actuation of which is controlled by said touch-operated switch means.

9. A feeding apparatus as defined in claim 7 including plunger means held for vertical reciprocatory movement in line with said aperture in said table means for assisting in the removal of food from an aligned aperture in said food bar means.

10. A feeding apparatus is defined in claim 9 including drive means to drive said plunger means positively in a direction away from said table means with said plunger means being returned by gravity when said plunger means moves toward said table means.

11. A feeding apparatus as defined in claim 9 wherein said plunger means is formed a multiple parts with the lowest part thereof being mounted on swivel means to facilitate the insertion thereof into a selected aperture in said food bar means.

12. A feeding aparatus for physically handicapped persons which comprises:
   a. electric motor-operated spoon means for conveying food from a food-receiving position to a food-consuming position,
   b. electric motor-operated food carriage means for positioning the food to be consumed at said food-receiving position,
   c. electric motor-operated indexing means for incrementally moving food on said food-carriage means to said food-receiving position,
   d. electric motor-operated plunger means for transferring food at said food-receiving position to said spoon means,
   e. and touch-operated switch means for selectively operating all of said electric motor-operated means.

13. A feeding apparatus as defined in claim 12 including switch means for interrupting the electrical current to all of said electrical motor-operated means except to said electric motor-operated spoon means when said spoon means is away from said food-receiving position.

14. A feeding apparatus as defined in claim 12 including emergency switch means for interrupting the electrical current to all of said electric motor-operated means substantially instantaneously.

15. A feeding apparatus as defined in claim 12 wherein said apparatus is mounted on table means with said table means being provided with an aperture at said food-receiving position.

16. A feeding apparatus as defined in claim 15 wherein said food-carriage means comprises a plurality of food bar means with each bar having a plurality of apertures therein alignable with said aperture in said table means, and holder means for holding said food bar means and for moving said food bar means in unison.

17. A feeding apparatus as defined in claim 16 wherein said holder means and said table means are provided with cooperating track means whereby said holder means may be reciprocated forwardly and rearwardly on said table means.

18. A feeding apparatus as defined in claim 17 wherein said motor-operated indexing means moves a selected one of said food bar means a predetermined distance toward said aperture in said table means.

19. A feeding apparatus as defined in claim 12 including drive means to drive said plunger means positively in a direction away from said table means with said plunger means being returned by gravity when said plunger means moves toward said table means.

20. A feeding apparatus as defined in claim 12 wherein said plunger means is formed in multiple parts with the lower part thereof being mounted on swivel means to facilitate the insertion thereof into a selected aperture in said food bar means.

* * * * *